United States Patent [19]

Jaster

[11] Patent Number: 5,431,026
[45] Date of Patent: Jul. 11, 1995

[54] REFRIGERANT FLOW RATE CONTROL BASED ON LIQUID LEVEL IN DUAL EVAPORATOR TWO-STAGE REFRIGERATION CYCLES

[75] Inventor: Heinz Jaster, Schenectady, N.Y.

[73] Assignee: General Electric Company, Schenectady, N.Y.

[21] Appl. No.: 205,859

[22] Filed: Mar. 3, 1994

[51] Int. Cl.⁶ ............................................. F25B 41/04
[52] U.S. Cl. ................................... 62/221; 62/198; 62/509; 62/526
[58] Field of Search ............... 62/218, 526, 117, 221, 62/198, 509

[56] References Cited

U.S. PATENT DOCUMENTS

| | | | |
|---|---|---|---|
| 3,443,121 | 5/1969 | Weisbrod | 236/46 F |
| 3,698,204 | 10/1972 | Schlotterbeck et al. | 62/206 |
| 4,167,858 | 9/1979 | Kojima et al. | 62/126 |
| 4,651,535 | 3/1987 | Alsenz | 62/225 |
| 4,653,288 | 3/1987 | Sayo et al. | 62/210 |
| 4,677,830 | 7/1987 | Sumikawa et al. | 62/126 |
| 4,745,767 | 5/1988 | Ohya et al. | 62/211 |
| 4,910,972 | 3/1990 | Jaster | 62/335 |
| 5,094,086 | 3/1992 | Shyu | 62/218 |
| 5,228,308 | 7/1993 | Day et al. | 62/198 |
| 5,247,989 | 9/1993 | Benevelli | 165/30 |
| 5,255,529 | 10/1993 | Powell et al. | 62/180 |
| 5,255,530 | 10/1993 | Janke | 62/180 |

*Primary Examiner*—William E. Wayner
*Attorney, Agent, or Firm*—Patrick R. Scanlon; Paul R. Webb, II

[57] ABSTRACT

Pulse width modulation is used to control the flow rate through a solenoid expansion valve in a refrigeration system using a dual evaporator, two-stage cycle. The refrigeration cycle includes a phase separator which receives two phase refrigerant from the low temperature evaporator and supplies liquid refrigerant to the pulse width modulated solenoid valve. A liquid level sensor is disposed in the phase separator, and a controller for controlling the duty cycle of the pulse width modulated solenoid valve is provided to receive input from the liquid level sensor. The liquid level sensor can be of the type which provides a continuously variable signal as a function of liquid level, or it can be a liquid level switch which controls valve duty cycle on the basis of whether the phase separator liquid level is above or below a set level. Alternatively, two liquid level switches can be provided.

7 Claims, 3 Drawing Sheets

REFRIGERANT FLOW RATE CONTROL BASED ON LIQUID LEVEL IN DUAL EVAPORATOR TWO-STAGE REFRIGERATION CYCLES

CROSS REFERENCE TO RELATED APPLICATIONS

This application is related to copending application entitled "Refrigerant Flow Rate Control Based on Liquid Level in Simple Vapor Compression Refrigeration Cycles," Serial No. 08/205,855, filed concurrently herewith and assigned to the same assignee as the present invention.

BACKGROUND OF THE INVENTION

This invention relates generally to refrigerant expansion control in refrigeration systems and more particularly concerns using pulse width modulated solenoid valves for expansion control. As used herein, the term "refrigeration system" refers to refrigerators, air conditioners or any other system which produces a refrigeration effect.

Conventional refrigeration systems used in household refrigerators typically operate on the simple vapor compression cycle which includes a compressor, a condenser, an expansion device, and an evaporator all connected in series in the order given. Refrigerator air is blown across the evaporator and the air flow is controlled so that part of the air flow goes to the freezer compartment and the remainder of the air flow goes to the fresh food compartment. The refrigerator cycle, therefore, produces its refrigeration effect at a temperature which is appropriate for the freezer compartment, but lower than it needs to be for the fresh food compartment. Since the mechanical energy required to produce cooling at low temperatures is greater than it is at higher temperatures, the simple vapor compression cycle uses more mechanical energy than one which produces cooling at two temperature levels.

A refrigeration cycle suitable for use in a household refrigerator and having improved thermodynamic efficiency is described in U.S. Pat. No. 4,910,972, issued Mar. 27, 1990 to Heinz Jaster and assigned to the same assignee as the present invention. The cycle disclosed in U.S. Pat. No. 4,910,972 comprises first and second compressors, a condenser, a first expansion device, a first evaporator, a phase separator, a second expansion device, and a second evaporator all connected in series in the order given. The phase separator receives two phase refrigerant from the first evaporator and provides liquid refrigerant to the second expansion device and saturated vapor refrigerant to the second compressor. The first evaporator is operated at approximately 25° F. and cools the fresh food compartment; the second evaporator is operated at approximately −10° F. and cools the freezer compartment. Thus, this dual evaporator, two-stage cycle uses much less mechanical energy than the typical single evaporator system.

Household refrigerators typically use capillary tubes as the expansion devices because they are simple, low cost devices. However, capillary tubes have a number of limitations as expansion devices. For instance, capillary tubes must be made very long to allow an inside diameter which is manufacturable and large enough to avoid clogging. This needed length takes up space in the refrigerator. The use of capillary tube expansion control also requires very precise refrigerant charging operations during production because the flow rate through the capillary tube is highly sensitive to the amount of refrigerant charge in the system.

Capillary tubes have additional limitations which are specific to the dual evaporator, two-stage refrigeration cycle. A typical compartment temperature control scheme for the dual evaporator, two-stage cycle is to run the fan of the evaporator whose compartment temperature is above a set point and shut down all fans and the compressor if lower temperature set points have been reached in both compartments. If both capillary tubes are sized for the case in which both evaporator fans are running, then, when the fresh food compartment fan is shut down, the fresh food evaporator pressure drops, causing less flow through the second capillary tube. When this happens, the liquid level in the phase separator rises, and liquid refrigerant can spill into the fresh food suction line. This will also cause considerable superheat at the freezer evaporator exit, causing a drop in freezer evaporator pressure. All of these phenomena lower the cooling capacity of the freezer and the system coefficient of performance.

Furthermore, a capillary tube can be sized to provide the optimum refrigerant flow rate for only one operating condition. Capillary tubes are thus typically sized to provide the optimum flow rate for normal operating conditions. This means that when the refrigeration cycle begins (as well as under high load conditions), the capillary tube is undersized, and the evaporator is starved of refrigerant. This reduces the cooling capacity and efficiency of the refrigerator. Near the end of the refrigeration cycle, the capillary tube will be oversized and the evaporator will be flooded, again reducing efficiency. Because of this, cycle efficiency using capillary tube expansion is considerably below that attainable with active expansion control.

However, active expansion control, in the form of conventional thermostatic expansion valves, does not work well in household refrigerators. While thermostatic expansion valves are often used in automotive air conditioning and commercial refrigeration systems which have large refrigerant flow rates, they cannot be made with orifices small enough to regulate the very low flow rates (typically 10–12 lb/hr) of household refrigerators. That is, to achieve the required pressure drop the valve orifice would need to be on the order of 10 mils or less, a size that is impractical to manufacture and very susceptible to plugging.

Accordingly, there is a need for an alternative to capillary tubes and thermostatic expansion valves as expansion control in household refrigerators.

SUMMARY OF THE INVENTION

The above-mentioned needs are met by the present invention which uses a pulse width modulated solenoid valve for expansion control. A pulse width modulated control signal is generated for cyclically opening and closing the valve. The pulse width of the control signal determines the average flow rate through the valve. The duty cycle of the valve is varied in accordance with phase separator liquid level to precisely control the average flow rate.

Specifically, the present invention provides a refrigeration system comprising a first expansion device which is a pulse width modulated solenoid valve, a freezer evaporator, first and second compressors, a condenser, a second expansion device, and a fresh food evaporator, all the above elements connected together in series, in that order. A phase separator is connected to receive refrigerant from the fresh food evaporator and has a first outlet for supplying liquid refrigerant to the pulse width modulated solenoid valve and a second outlet for supplying gaseous refrigerant to the second compressor. A liquid level sensor is disposed in the phase separator, and a controller for controlling the duty cycle of the pulse width modulated solenoid valve is provided to receive input from the liquid level sensor.

The liquid level sensor can be of the type which provides a continuously variable signal as a function of liquid level, or it can be a liquid level switch. In the latter case, the controller produces a control signal having a first pulse width when the phase separator liquid level is above the liquid level switch and produces a control signal having a second, smaller pulse width when the liquid level is below the liquid level switch. Alternatively, two liquid level switches can be provided. In which case, the controller increases the pulse width of its control signal when the liquid level is above the upper liquid level switch and decreases the pulse width of its control signal when the liquid level is below the lower liquid level switch.

Several advantages are realized by using a pulse width modulated solenoid valve for expansion control. Because of its oscillating manner of operation, the pulse width modulated-solenoid valve can be made with a larger orifice, thereby avoiding plugging problems. Systems using pulse width modulated control are relatively insensitive to total refrigerant charge which eases charging requirements during production. Pulse width modulated solenoid valves are beneficial for use with variable and/or multi-speed compressors because of the ability to match different flow rates as the compressor displacement changes. During the off cycle, a pulse width modulation solenoid valve can be used to maintain a positive seal between the high and low pressures, thereby preventing refrigerant migration and conserving energy. The solenoid valve therefore acts as an energy valve, eliminating the need for a separate valve to serve this function.

In addition to assuring sufficient liquid refrigerant for the freezer evaporator, controlling the phase separator liquid level also prevents liquid refrigerant from entering the fresh food suction line. Phase separator liquid level can be monitored with a single sensor, and "hunting" can be avoided because of the proximity of the phase separator to the expansion valve.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
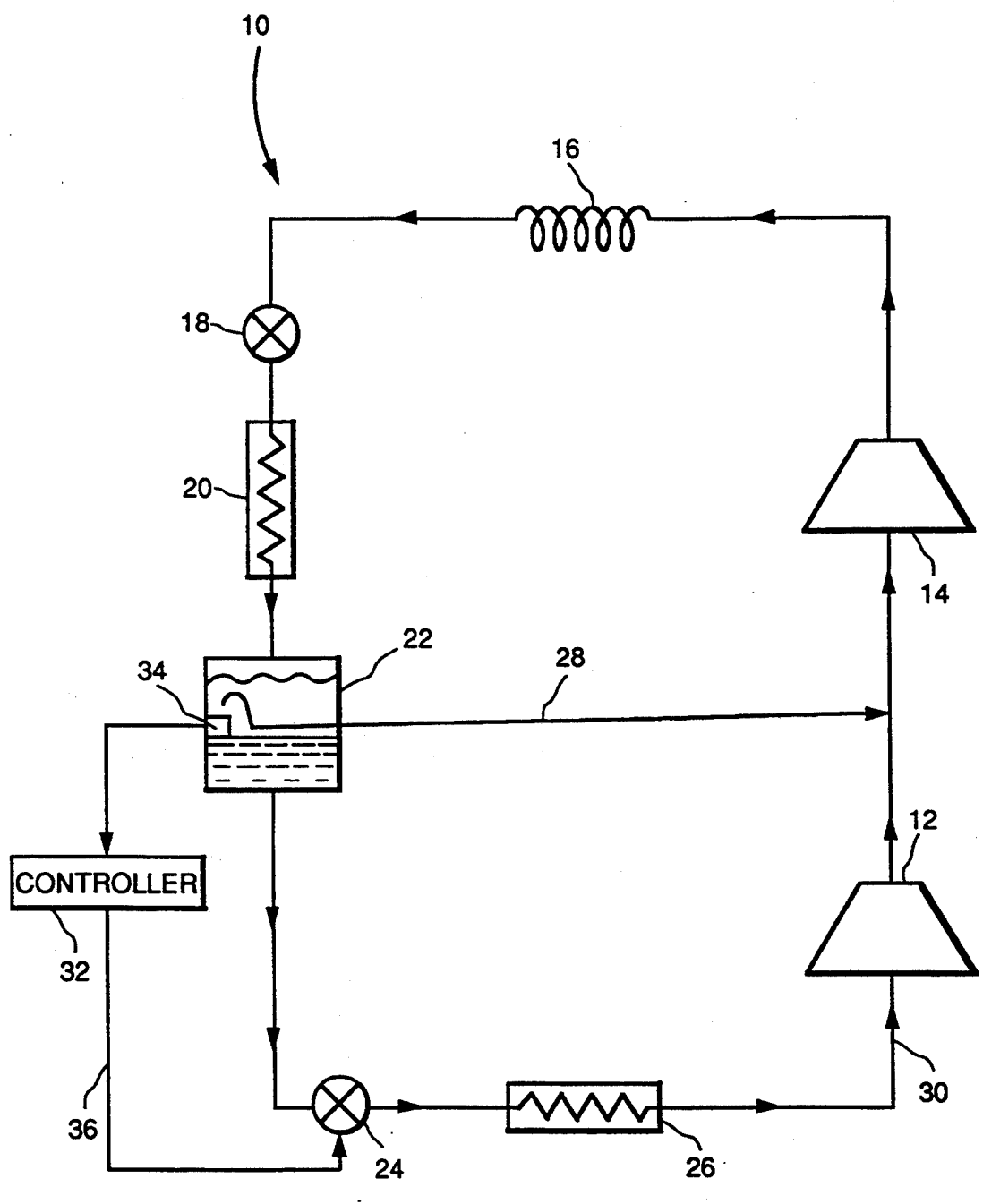
FIG. 1 is a schematic representation of one embodiment of a refrigeration cycle in accordance with the present invention.

Referring to the drawings wherein identical reference numerals denote the same elements throughout the various views, FIG. 1 shows a refrigeration system 10 comprising a first compressor 12, a second compressor 14, a condenser 16, a first expansion device 18, a first evaporator 20, a phase separator 22, a second expansion device 24, and a second evaporator 26 all connected in series in the order given. The refrigeration system 10 is charged with a refrigerant which is compressed in the compressors 12, 14. The compressed refrigerant is then discharged to the condenser 16, where it is cooled and condensed. Next, the refrigerant flows through the first expansion device 18, expanding while it does so, and into the first evaporator 20 which is disposed within the fresh food compartment of the refrigerator. Heat is transferred from the fresh food compartment to the refrigerant flowing through the fresh food evaporator 20, thereby cooling the compartment.

Two phase refrigerant is discharged from the fresh food evaporator 20 to the phase separator 22. The phase separator 22 comprises a closed receptacle having an inlet in its upper portion for admitting the two phase refrigerant and having two outlets. One outlet is located at the bottom of the receptacle and provides liquid refrigerant to the second expansion device 24. The other outlet is provided by a conduit which extends from the interior of the upper portion of the receptacle to the exterior. The conduit is thus arranged to provide gaseous refrigerant to a fresh food suction line 28 which is connected to the inlet of the second compressor 14.

The liquid refrigerant provided to the second expansion device 24 is expanded therein and then flows to the second evaporator 26 which is disposed within the freezer compartment. As the refrigerant flows through the freezer evaporator 26, heat is transferred from the freezer compartment to the refrigerant, causing the refrigerant to evaporate. The refrigerant preferably assumes a superheated gaseous state by the time it exits the freezer evaporator 26. The gaseous refrigerant is then passed through a freezer suction line 30 and returned to the first compressor 12. The compressed gaseous refrigerant output by the first compressor 12 is combined with the gaseous refrigerant from the fresh food suction line 28, and the combined refrigerant flow is connected to the inlet of the second compressor 14, at which point the cycle is repeated. This dual evaporator, two-stage cycle is more fully described in the above-mentioned U.S. Pat. No. 4,910,972, which is hereby incorporated by reference.

Although not shown in FIG. 1, it should be understood that the fresh food suction line 28 can be arranged in a countercurrent heat exchange relationship with the refrigerant line between the condenser 16 and the first expansion device 18 so as to improve cycle efficiency. Similarly, the freezer suction line 30 can be arranged in a countercurrent heat exchange relationship with the refrigerant line between the condenser 16 and the first expansion device 18 and with the refrigerant line between the phase separator 22 and the second expansion device 24. The heat transfer relationships are typically accomplished by soldering the respective lines (or at least portions thereof) together.

In accordance with the present invention, the second expansion device 24 is a pulse width modulated solenoid valve which is controlled by a controller 32 as part of a feedback loop. The controller 32 controls the expansion valve 24 on the basis of the liquid level in the phase separator 22. To this end, the phase separator 22 is provided with a liquid level sensor 34. The liquid level sensor 34 detects the liquid level in the phase separator 22 and produces an output signal corresponding to the detected level. The controller 32 receives the output signal and produces a control signal 36 which is fed to the solenoid valve 24. The control signal 36 is a pulse width modulated frequency signal which causes the valve 24 to oscillate between a fully open condition and a fully closed condition such that the duty cycle of the open-to-closed conditions determines the average flow rate through the expansion valve 24. The pulse width is adjusted in accordance with the detected liquid level to control the duty cycle of the valve 24 to maintain a desired liquid level for optimal system performance. Generally, as the liquid level rises, the flow rate will be increased, and as the liquid level falls, the flow rate will be decreased.

Figure 2:
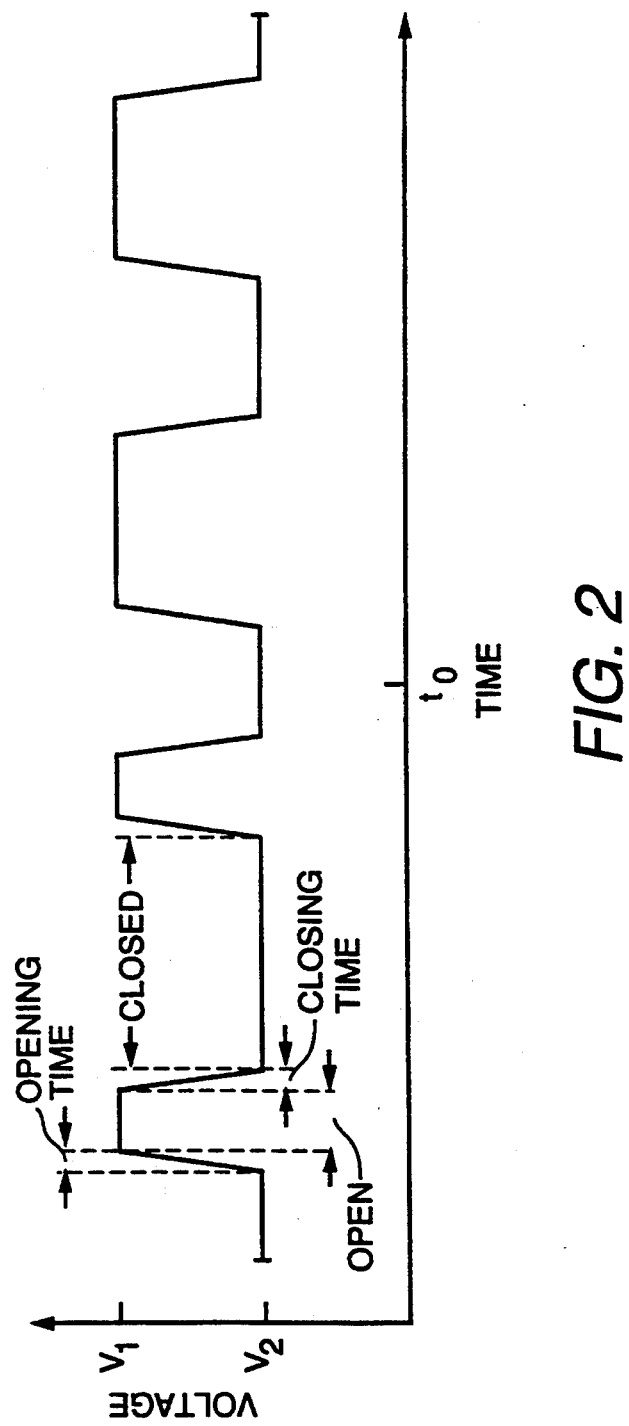
FIG. 2 is an illustration of a pulse width modulated frequency signal used in accordance with the present invention to control an expansion valve.

FIG. 2 shows a sample waveform for the control signal 36. The waveform is a digital square wave which alternates between a maximum control voltage $V_1$ and a minimum control voltage $V_2$. When the waveform is in the maximum control voltage $V_1$, the valve 24 is moved to the fully open condition, and when the waveform is in the minimum control voltage $V_2$, the valve 24 is moved to the fully closed condition. Instead of an instantaneous voltage change, the pulse width modulated waveform shown in FIG. 2 has a brief transition period between the maximum and minimum voltages. This avoids the problem of a pressure shockwave being generated in the refrigerant which can occur when an expansion valve is abruptly opened and closed. The frequency of the waveform is constant regardless of system flow rate demand conditions. Preferably, this frequency is set in the range of about 0.1–2 hertz.

The average flow rate through the expansion valve 24 is dependent on the duty cycle of the pulse width modulated waveform. Thus, prior to the time $t_0$ shown in FIG. 2, the time the valve 24 is fully open is less than the time the valve 24 is fully closed, thereby producing a relatively low average flow rate. After time $t_0$ (at which time increased liquid level in the phase separator 22 is detected), the controller 32 adjusts the duty cycle so that the time the valve 24 is fully open is increased with respect to the time the valve 24 is fully closed, thereby producing a larger average flow rate.

Preferably, the expansion valve 24 is a normally closed valve; that is, the valve 24 closes when its solenoid coil is not energized. This means that the minimum control voltage $V_2$ can be zero for valve closure. Furthermore, power to the valve 24 is interrupted whenever the compressor 12 is shut down. The valve 24 thus remains closed during periods of compressor shutdown. This prevents refrigerant migration to the evaporator 18 during the off cycle, thereby conserving energy. The solenoid valve 24 therefore acts as an energy valve, eliminating the need for a separate valve to serve this function.

The controller 32 can comprise one of a variety of pulse width modulation control schemes known in the art. Suitable pulse width modulation controllers are described in U.S. Pat. No. 4,651,535 issued Mar. 24, 1987 to Richard H. Alsenz and in U.S. Pat. No. 5,255,530 issued Oct. 26, 1993 to Donald E. Janke, both of which are herein incorporated by reference.

The liquid level sensor 34 can be almost any type of liquid level sensing device known in the art. One type of sensor suitable for the present invention is a sensor which provides a continuously variable current or voltage signal as a function of the liquid level. In this case, the control signal 36 would be continuously adjusted according to the liquid level. Thus, the average flow rate through the valve 24 would be closely controlled in response to the liquid level in the phase separator 22. Another less precise but less expensive approach would be to use a liquid level switch such as a float switch. The liquid level switch only indicates whether the liquid level is above or below a set level. In the present invention, the control signal 36 would be provided with a relatively large pulse width if the liquid level in the phase separator 22 was above the set level and a smaller pulse width if the liquid level was below the set level.

Figure 3:
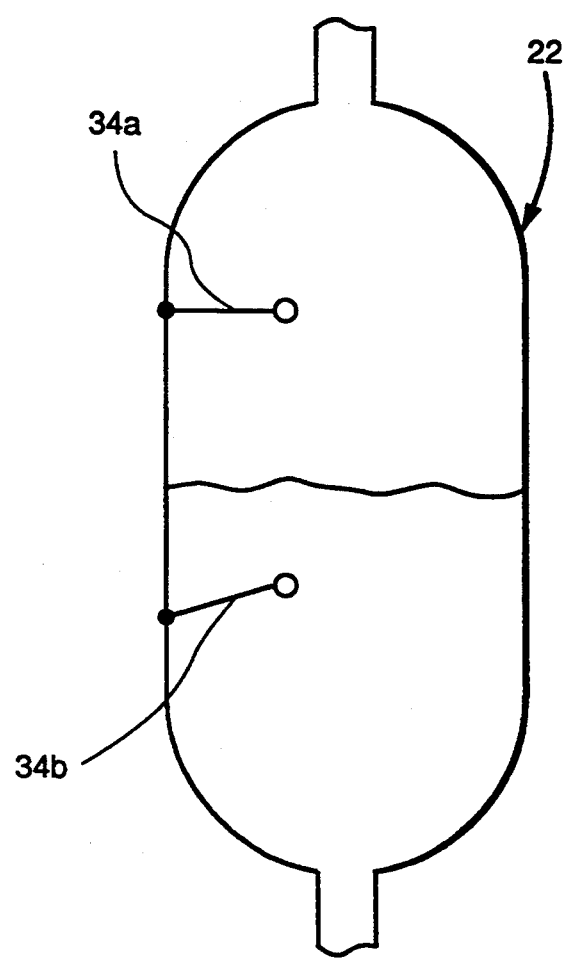
FIG. 3 is a schematic representation of a liquid level sensing configuration which uses two liquid level switches.

FIG. 3 shows an alternative configuration which uses two liquid level switches. A first liquid level switch 34a is positioned in the phase separator 22 at a point of maximum desired liquid level, and a second liquid level switch 34b is positioned at a point of minimum desired liquid level. The pulse width of the control signal would be set for a normal flow rate through the valve 24 as long as the actual liquid level was between the two liquid level switches 34a, 34b. Whenever the liquid level exceeded the maximum level, the first liquid level switch 34a would be triggered and the pulse width of the control signal 36 would be increased. Whenever the liquid level fell below the minimum level, the second liquid level switch 34b would be triggered and the pulse width of the control signal 36 would be decreased. In addition, if, after a given period of time following one of the liquid level switches 34a, 34b being triggered and the pulse width being adjusted accordingly, the liquid level has not returned to a normal level, then the pulse width can be further increased or decreased, depending on which liquid level switch was triggered.

The first expansion device 18 can be either a conventional expansion device such as a capillary tube or another pulse width modulated solenoid valve which is also controlled by the controller 32. In the latter case, another phase separator would be placed in the refrigerant line between the condenser 14 and the first expansion device 18. The additional phase separator would be equipped with a liquid level sensor for feedback to the controller 32. Unlike the other phase separator 22, the additional phase separator would only require a single outlet in its bottom for providing liquid refrigerant to the first expansion device 18.

The foregoing has described an improved refrigeration system which uses a pulse width modulated solenoid valve for expansion control. The valve is controlled on the basis of liquid level in the phase separator. While specific embodiments of the present invention have been described, it will be apparent to those skilled in the art that various modifications thereto can be made without departing from the spirit and scope of the invention as defined in the appended claims.

What is claimed is:

1. A refrigeration system for use in a refrigerator having a freezer compartment and a fresh food compartment, said refrigeration system comprising:
   first and second compressors;
   a condenser;
   a first expansion device;

a first evaporator for providing cooling to the fresh food compartment;

a phase separator connected to receive refrigerant from said first evaporator;

a second expansion device comprising a pulse width modulated solenoid valve;

a second evaporator for providing cooling to the freezer compartment, all the above elements connected together in series, in that order, said phase separator having a first outlet for supplying liquid refrigerant to said pulse width modulated solenoid valve and a second outlet for supplying gaseous refrigerant to said second compressor;

a liquid level sensor disposed in said phase separator; and a controller for controlling the duty cycle of said pulse width modulated solenoid valve, said controller having an input connected to said liquid level sensor.

2. The refrigeration system of claim 1 wherein said liquid level sensor provides a continuously variable signal as a function of the liquid level in said phase separator.

3. The refrigeration system of claim 1 wherein said liquid level sensor is a liquid level switch.

4. The refrigeration system of claim 3 wherein said controller produces a control signal having a first pulse width when the liquid level in said phase separator is above said liquid level switch, and said controller produces a control signal having a second pulse width when the liquid level in said phase separator is below said liquid level switch, said first pulse width being larger than said second pulse width.

5. The refrigeration system of claim 3 further comprising an additional liquid level switch disposed in said phase separator and connected to an input of said controller, said additional liquid level switch being positioned below said first-mentioned liquid level switch.

6. The refrigeration system of claim 5 wherein said controller increases the pulse width of its control signal when the liquid level in said phase separator is above said first-mentioned liquid level switch, and said controller decreases the pulse width of its control signal when the liquid level in said phase separator is below said additional liquid level switch.

7. ,The refrigeration system of claim 1 wherein said first expansion device is a pulse width modulated solenoid valve.

* * * * *